(12) United States Patent
Ishii et al.

(10) Patent No.: US 11,511,821 B2
(45) Date of Patent: Nov. 29, 2022

(54) LEANING VEHICLE AND VEHICLE LEANING UNIT

(71) Applicant: KAWASAKI MOTORS, LTD., Akashi (JP)

(72) Inventors: Hiroshi Ishii, Kobe (JP); Taro Iwamoto, Kobe (JP); Takeshi Nakajima, Kobe (JP); Kazuya Nagasaka, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 288 days.

(21) Appl. No.: 16/904,187

(22) Filed: Jun. 17, 2020

(65) Prior Publication Data
US 2020/0398926 A1 Dec. 24, 2020

(30) Foreign Application Priority Data
Jun. 19, 2019 (JP) .............................. JP2019-113273

(51) Int. Cl.
*B60G 21/00* (2006.01)
*B62K 5/10* (2013.01)
*B62K 5/05* (2013.01)

(52) U.S. Cl.
CPC .............. *B62K 5/10* (2013.01); *B60G 21/007* (2013.01); *B62K 5/05* (2013.01)

(58) Field of Classification Search
CPC ................................ B60G 21/007; B62K 5/10
See application file for complete search history.

(56) References Cited

U.S. PATENT DOCUMENTS

| 11,117,636 B2* | 9/2021 | Raffaelli | B62K 5/027 |
| 11,230,339 B2* | 1/2022 | Raffaelli | B62K 5/027 |
| 2011/0298191 A1* | 12/2011 | Pozio | B62K 5/10 |
| | | | 280/124.116 |
| 2013/0181420 A1* | 7/2013 | Hsu | B62K 5/025 |
| | | | 280/93.502 |
| 2016/0229480 A1 | 8/2016 | Mori | |

(Continued)

FOREIGN PATENT DOCUMENTS

| DE | 102020106510 B3 * | 4/2021 | |
| EP | 2077223 A1 | 7/2009 | |
| EP | 2399811 A1 * | 12/2011 | B62K 25/16 |

(Continued)

*Primary Examiner* — Paul N Dickson
*Assistant Examiner* — Maxwell L Meshaka
(74) *Attorney, Agent, or Firm* — Fay Kaplun & Marcin, LLP (57) ABSTRACT

A leaning vehicle includes a base member, an upper arm, a lower arm, a first support member, a second support member, a first wheel, a second wheel, and a steering operation member. The upper arm, the lower arm, the first support member, the second support member constitute a parallel link mechanism. The first wheel is movable integrally with the first support member in a turning direction of the base member. The second wheel is movable integrally with the second support member in the turning direction of the base member. According to turning of the base member by operating the steering operation member, all of the upper arm, the lower arm, the first support member, the second support member, the first wheel, and the second wheel turn around a turning center of the base member.

15 Claims, 9 Drawing Sheets

(56) References Cited

U.S. PATENT DOCUMENTS

2021/0039738 A1* 2/2021 Raffaelli ................ B62K 5/027
2021/0284270 A1* 9/2021 Kurakake ................ B62K 5/05

FOREIGN PATENT DOCUMENTS

| | | |
|---|---|---|
| EP | 2 923 934 A1 | 9/2015 |
| FR | 3040363 A1 | 3/2017 |
| FR | 3047722 A1 | 8/2017 |
| JP | 2013256237 A | 12/2013 |
| JP | 6170086 B2 | 7/2017 |
| KR | 20110115287 A | 10/2011 |
| WO | 2014/098223 A1 | 6/2014 |
| WO | 2017/032951 A1 | 3/2017 |
| WO | WO-2021039990 A1 * | 3/2021 |

* cited by examiner

LEANING VEHICLE AND VEHICLE LEANING UNIT

CROSS-REFERENCE TO RELATED APPLICATIONS

This application claims priority based on the Paris Convention based on Japanese Patent Application Serial No. 2019-113273 filed on Jun. 19, 2019, the contents of which are included below.

BACKGROUND

Field

The present disclosure relates to a leaning vehicle and a vehicle leaning unit.

Discussion of the Background

As disclosed by JP Patent No. 6170086 B2, a conventional well-known twin front wheeled vehicle, which may be referred to as a "leaning vehicle", is equipped with left and right front wheels.

This vehicle includes upper arm members, lower arm members and left and right knuckle members. The upper arm members and the lower arm members are swingably supported at respective laterally proximal sides thereof by a vehicle body, and steerably support left and right front wheels at respective laterally distal sides thereof. The left and right knuckle members are connected to a steering link mechanism via left and right tie rods, respectively. The upper arm members, the lower arm members and left and right outer link members are arranged in a parallel link-like form so that the pair of left and right outer link members, the pair of left and right knuckle members, and the pair of left and right front wheels are kept substantially laterally parallel to each other while they move vertically according to vertical swing of the upper and lower arm members.

The parallel link-formed arrangement including the upper and lower arm members and the left and right outer link members cooperates with the steering link mechanism to lean and steer (i.e., change the travel direction of) the twin front wheeled vehicle. However, the parallel link-formed arrangement is structurally independent of the steering link mechanism, thereby complicating the structure for leaning and steering the vehicle.

Therefore, the twin front wheeled vehicle is desired to have a simple structure for its leaning and steering.

SUMMARY

In a first aspect, a leaning vehicle includes a vehicle body, a base member, an upper arm, a lower arm, a first support member, a second support member, a first wheel, a second wheel, and a steering operation member. The base member is supported to the vehicle body so as to be turnable around a turning center relative to the vehicle body. The upper arm is pivoted at a longitudinally intermediate portion thereof to the base member at a height. The lower arm is pivoted at a longitudinally intermediate portion thereof to the base member at another height below the height to pivot the upper arm to the base member. The first support member is disposed on one of opposite sides of the base member in a vehicle-width direction. The second support member is disposed on the other of the opposite sides of the base member in the vehicle-width direction. The first wheel is pivoted to the first support member. The second wheel is pivoted to the second support member. The steering operation member is operable to turn the base member. The upper arm, the lower arm, the first support member and the second support member constitute a parallel link mechanism. The first wheel is movable integrally with the first support member in the turning direction of the base member. The second wheel is movable integrally with the second support member in the turning direction of the base member. According to turning of the base member, all of the upper arm, the lower arm, the first support member, the second support member, the first wheel and the second wheel turn around the turning center of the base member.

Therefore, by turning the base member, all the parallel link mechanism and the two wheels turn to change a traveling direction of the leaning vehicle. Such a simple structure achieves the required leaning and travel direction changing of the leaning vehicle, thereby reducing the number of component members and costs. Further, since the first and second wheels turn together with the parallel link according to operation of the steering operation member, a play in turning of the first and second wheels in response to operation of the steering operation member is reduced, thereby enhancing the feeling of direct steering response.

In a second aspect, a vehicle leaning unit includes a base member, an upper arm, a lower arm, a first support member, a second support member, a first wheel, and a second wheel. The base member is adaptable turnably around a turning center. The upper arm is pivoted at a longitudinally intermediate portion thereof to the base member at a height. The lower arm is pivoted at a longitudinally intermediate portion thereof to the base member at another height below the height to pivot the upper arm to the base member. The first support member is disposed on one of opposite sides of the base member in a vehicle-width direction. The second support member is disposed on the other of the opposite sides of the base member in the vehicle-width direction. The first wheel is pivoted to the first support member. The second wheel is pivoted to the second support member. The upper arm, the lower arm, the first support member and the second support member constitute a parallel link mechanism. The first wheel is movable integrally with the first support member in a turning direction of the base member. The second wheel is movable integrally with the second support member in the turning direction of the base member. According to turning of the base member, all of the upper arm, the lower arm, the first support member, the second support member, the first wheel and the second wheel turn around the turning center of the base member.

Therefore, by turning the base member, all the parallel link mechanism and the two wheels turn to change the traveling direction of a vehicle. By adapting the vehicle leaning unit having such a simple structure to a vehicle, the required leaning and travel direction changing of the vehicle is achieved, thereby reducing the number of component members and costs.

As mentioned above, the embodiments are advantageous to simplify a structure for leaning and traveling direction changing of a vehicle.

The above and other features and effects of the arts disclosed by the present application will become more apparent from the following detailed description with reference to the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
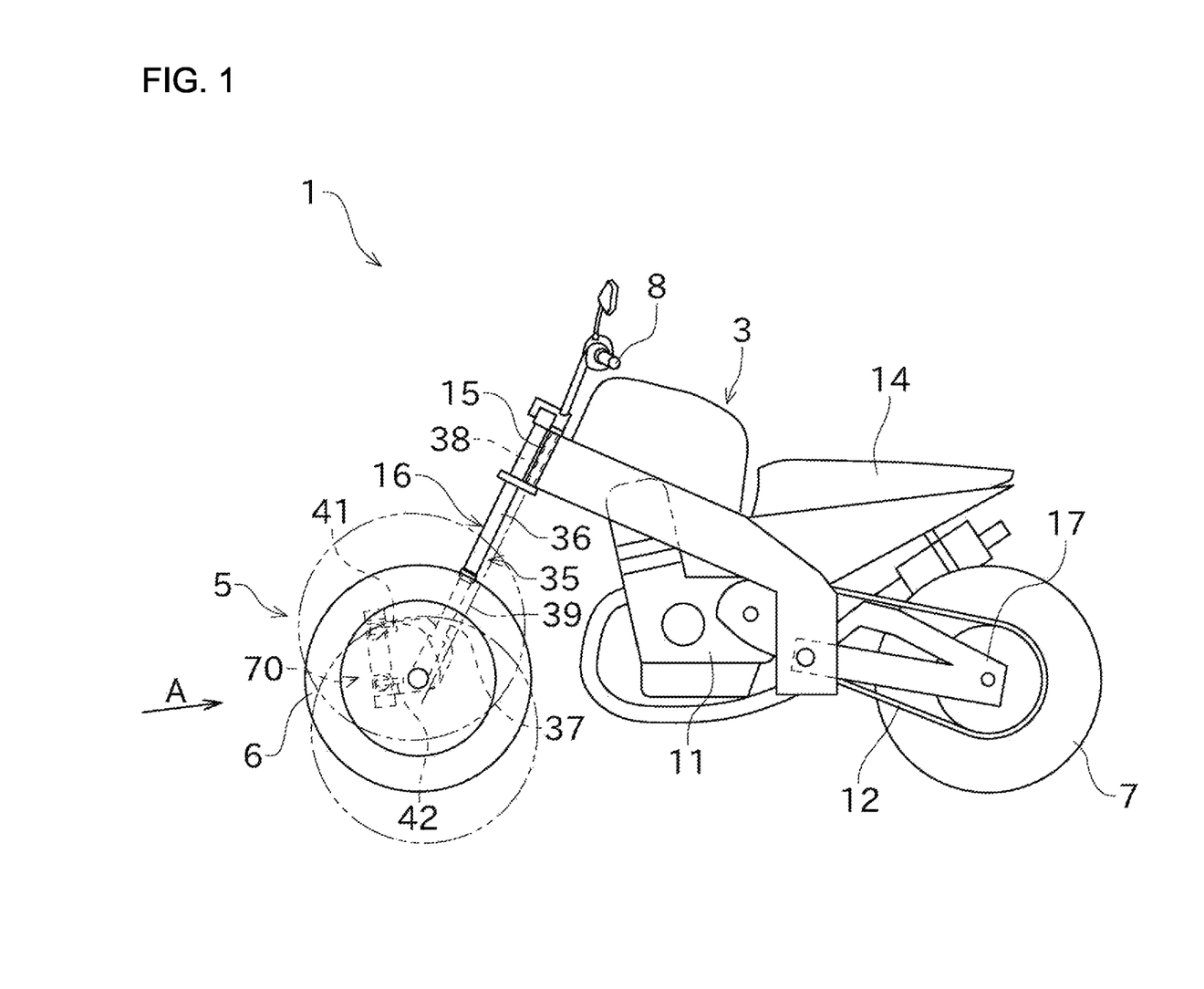
FIG. 1 is a side view of a leaning vehicle according to an exemplary embodiment.

An embodiment will be described with reference to drawings. FIG. 1 is a side view of a leaning vehicle 1 according to the embodiment.

Referring to FIG. 1, the leaning vehicle 1 is equipped with a vehicle body 3, a vehicle leaning unit 5, a rear wheel 7, and a steering handle 8 serving as a steering operation member. The vehicle leaning unit 5 includes twin front wheels 6. In the present embodiment, the leaning vehicle 1 equipped with the vehicle leaning unit 5 is configured as a saddle riding vehicle. However, any kind of vehicle may be equipped with the vehicle leaning unit 5.

An occupant riding the leaning vehicle 1 straddles the vehicle body 3 to operate the leaning vehicle 1. Hereinafter, unless otherwise specified, "front", "rear", "left" and "right" respectively mean "front", "rear", "left" and "right" as viewed by the occupant riding the leaning vehicle 1. A left-and-right direction corresponds to a vehicle-width direction, and a fore-and-aft direction corresponds to a vehicle-length direction.

The twin front wheels 6 of the vehicle leaning unit 5 are left and right wheels disposed leftward and rightward with respect to the vehicle body 3. The single rear wheel 7 is disposed at the central position with respect to the vehicle body 3 in the left-and-right direction, i.e., the vehicle-width direction. The vehicle leaning unit 5 will be described later.

The vehicle body 3 supports a prime mover for traveling of the leaning vehicle 1. In the present embodiment, referring to FIG. 1, an engine 11 serves as the prime mover. The engine 11 functions as a power unit for driving the rear wheel 7 serving as a drive wheel. For example, a gasoline engine serves as the engine 11. A driving power outputted from the engine 11 is transmitted to the rear wheel 7 via any one of multi-speed gear trains (not shown) and via a drive chain 12. Alternatively, for example, an electric motor may serve as the prime mover.

The vehicle body 3 includes a vehicle body frame. An occupant's seat 14 is disposed at an upper portion of the vehicle body 3. The steering handle 8 is disposed at a front upper portion of the vehicle body 3 operably by the occupant.

In the vehicle body 3, the vehicle body frame serves as a reinforcing skeleton framework supporting the engine 11 and others. For example, metal pipes are formed into the vehicle body frame. The vehicle body frame is provided at a front portion thereof with a head pipe 15 serving as a pivot support member.

Front forks 16 and a swing arm 17 are attached to the vehicle body frame of the vehicle body 3. The vehicle body frame includes the head pipe 15 to which the front forks 16 are attached. The vehicle leaning unit 5 including the twin front wheels 6 is mounted onto bottom tip portions of the front forks 16. The rear wheel 7 is pivoted to a rear tip portion of the swing arm 17.

Figure 2:
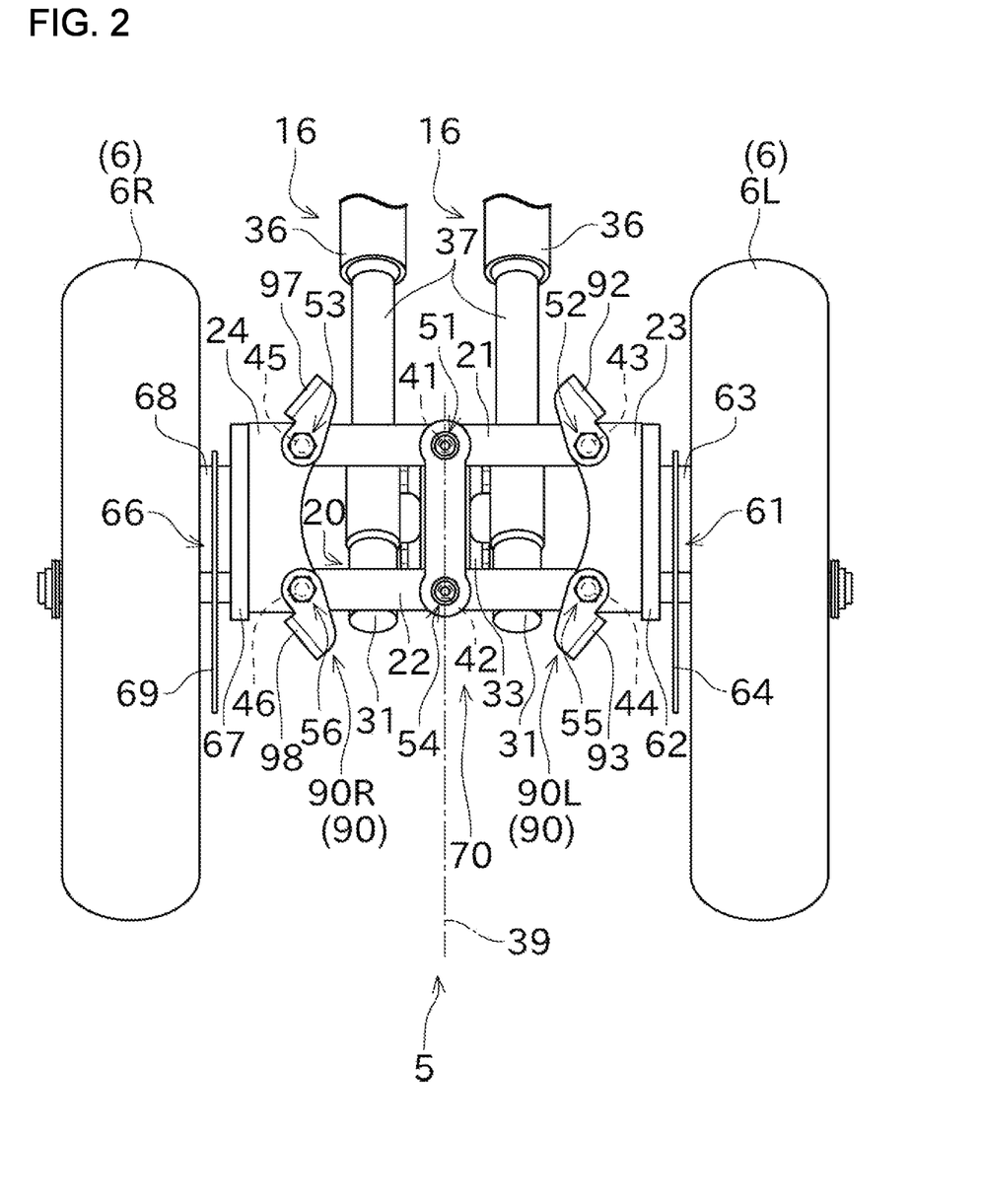
FIG. 2 is a perspective front bottom view of a vehicle leaning unit equipped on the leaning vehicle.
Figure 3:
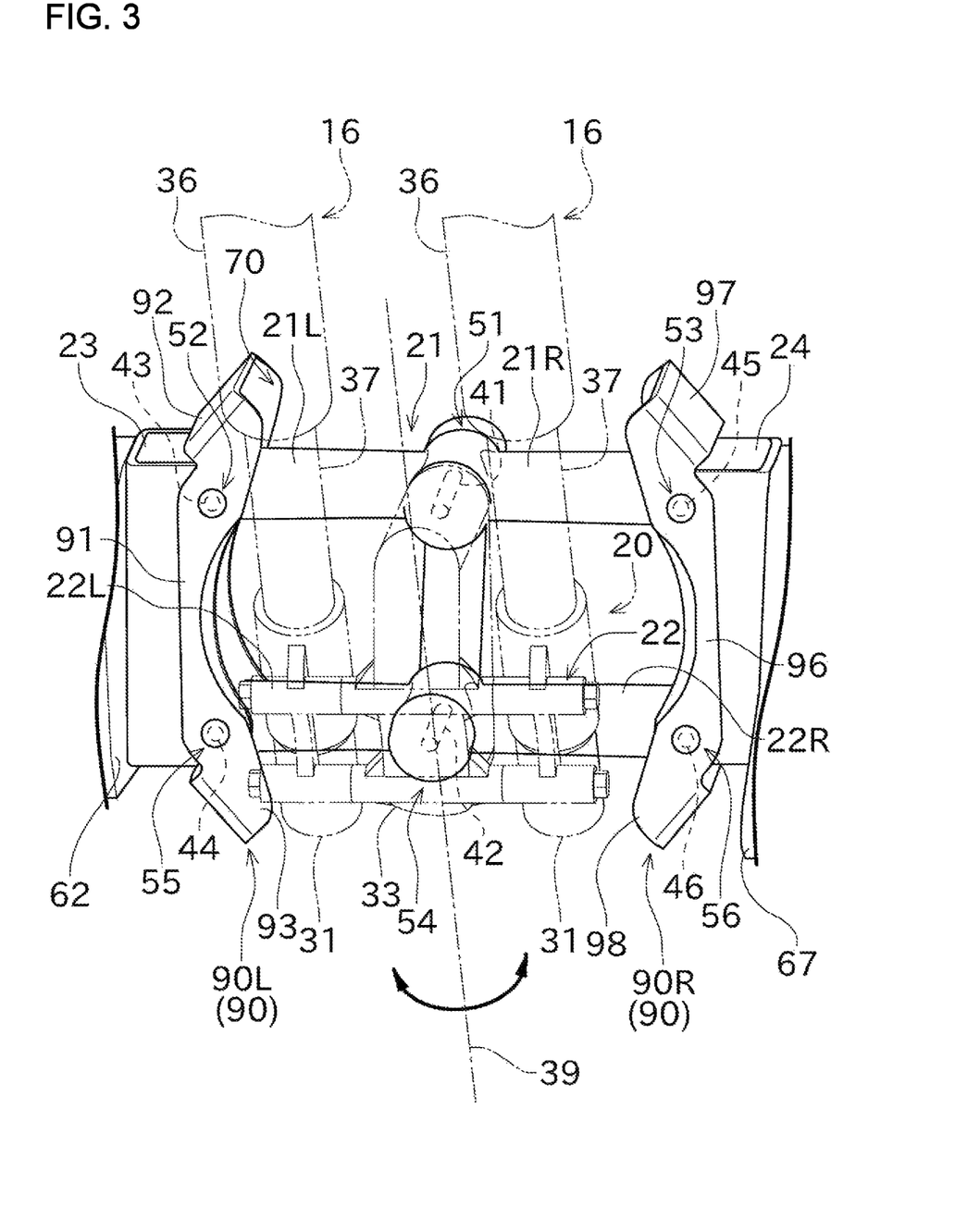
FIG. 3 is a perspective rear view of the vehicle leaning unit.

The vehicle leaning unit 5 will now be described. FIG. 2 is a perspective front bottom view of the vehicle leaning unit 5 equipped on the leaning vehicle 1. FIG. 3 is a perspective rear view of the vehicle leaning unit 5.

In FIG. 2, the vehicle leaning unit 5 is illustrated as that viewed in an A-arrowed direction in FIG. 1. Referring to FIG. 2, the vehicle leaning unit 5 including the left and right front wheels 6 includes a base member 20, an upper arm 21, a lower arm 22, a first support member 23 and a second support member 24. In the vehicle leaning unit 5, the base member 20, the upper arm 21, the lower arm 22, the first support member 23 and the second support member 24 are disposed between the left and right front wheels 6.

In the following description, the left one of the front wheels 6 may be referred to as a left front wheel 6L (serving as a first wheel), and the right one may be referred to as a right front wheel 6R (serving as a second wheel).

The base member 20 is supported by the vehicle body 3. The base member 20 can be turned by operating the steering handle 8. The front forks 16 (serving as a transmission member) are disposed between the base member 20 and the steering handle 8.

Referring to FIG. 3, the front forks 16 are juxtaposed left and right, and in the present embodiment, the base member 20 is fixed to bottom tip portions of the left and right front forks 16. The left and right front forks 16 have a space having a certain width in the left-and-right direction therebetween, and are extended vertically from the steering handle 8 to the respective front wheels 6 so that the front forks 16 transmit rotation of the steering handle 8 to the base member 20.

The base member 20 includes left and right fixture portions 31 and a support portion 33. Each of the left and right fixture portions 31 is formed in a cylindrical shape. The left and right fixture portions 31 are disposed so as to have the respective bottom tip portions of the left and right front forks 16 fitted and fixed thereinto. Therefore, the base member 20 is supported by the front forks 15 attached to the head pipe 15.

The support portion 33 is disposed between the left and right fixture portions 31 so as to extend vertically in front view. The support portion 33 is fixed to each of the left and right fixture portions 31.

In the present embodiment, the left and right front forks 16 are provided with respective front suspensions 35 serving as shock absorbers. Each of the front suspensions 35 reduces a shock transmitted from a road surface to the vehicle body 3 via the front wheels 6 during traveling of the leaning vehicle 1 on the road surface.

Each of the front suspensions 35 includes an outer tube 36 and an inner tube 37. Each front suspension 35 is provided at an upper portion thereof with the outer tube 36 fixed to a steering stem, and is provided at a lower portion thereof with the inner tube 37.

An upper portion of the inner tube 37 is inserted into the outer tube 36 axially (vertically) movably relative to the outer tube 36. A bottom tip portion of the inner tube 37 serves as the bottom tip portion of each front fork 16 fixedly fitted into each of the left and right fixture portions 31 of the base member 20.

In each front suspension 35, the outer tube 36 and the inner tube 37 are connected to each other via a spring. Due to the spring, each front fork 16 resiliently supports the corresponding front wheel 6. Each of the front suspensions 35 is vertically telescopic so as to allow the corresponding front wheel 6 to move vertically relative to the vehicle body 3. Each front suspension 35 applies an elastic force of its spring against its telescopic action, thereby reducing the allowed movement of the corresponding front wheel 6 upward and downward from a predetermined standard position relative to the vehicle body 3.

In addition to the left and right front forks 16, the head pipe 15 is interposed between the base member 20 and the steering handle 8, as shown in FIG. 1. The head pipe 15 is disposed below the steering handle 8 to pivotally support the steering handle 8 with a steering shaft 38 serving as a pivot shaft of the steering handle 8.

The steering shaft 38 is inserted into the head pipe 15 so that the steering handle 38 is rotatable relative to the vehicle body 3 including the head pipe 15 around the center axis of the head pipe 15. The steering shaft 38 is fixed to a center portion of the steering handle 8. The steering shaft 38 is connected to the left and right front forks 16.

By rotationally operating the steering handle 8, the base member 20 is rotationally turned integrally with the steering handle 8 and the left and right front forks 16. The rotational turn of the base member 20 is centered on a turning center axis 39 and is directed along a rotational direction designated by a bold arrow shown in FIG. 3. The turning center axis 39 is parallel to the steering shaft 38.

The upper arm 21 is pivoted at a longitudinally intermediate portion thereof to the base member 20 at a height. The upper arm 21 is disposed forward from the base member 20 (and the left and right front forks 16). A single arm member serving as the whole upper arm 21 is formed linearly to extend in the left-and-right direction between the left front wheel 6L and the right front wheel 6R.

In the present embodiment, the longitudinal intermediate portion of the upper arm 21 means a left-and-right center portion of the upper arm 21. The left-and-right center portion of the upper arm 21 is pivotally connected to an upper portion of the support portion 33 of the base member 20 via a first pivot shaft 41. A junction between the upper arm 21 and the base member 20 is defined as a first junction 50. Referring to FIG. 3, a portion of the upper arm 21 extended leftward from the first junction 50 is defined as a first left arm 21L, and another portion of the upper arm 21 extended rightward from the first junction 50 is defined as a first right arm 21R. The first left arm 21L and the first right arm 21R are integrally joined to each other. The first pivot shaft 41 is extended slightly downwardly forward.

Referring to FIG. 1, the first pivot shaft 41 is generally oriented in the fore-and-aft direction, however, slantwise so that its front and rear ends differ in height from each other. More specifically, the front end of the first pivot shaft 41 is slightly lower than the rear end of the first pivot shaft 41. When the steering handle 8 is disposed at its neutral position, the first pivot shaft 41 is inclined slightly downwardly forward. The upper arm 21 is rotatable as a seesaw centered on the first pivot shaft 41.

The lower arm 22 is pivoted at a longitudinally intermediate portion thereof to the base member 20 at another height below the height to pivot the upper arm 21 to the base member 20. The lower arm 22 is disposed forward from the base member 20 (and the left and right front forks 16). A single arm member serving as the whole lower arm 22 is formed linearly to extend in the left-and-right direction between the left front wheel 6L and the right front wheel 6R.

In the present embodiment, the lower arm 22 is formed in the same shape as the upper arm 21. The lower arm 22 is spaced downward from the upper arm 21 and is substantially parallel to the upper arm 21. The lower arm 22 is disposed so that left and right ends of the lower arm 22 substantially correspond to the left and right ends of the upper arm 21 in the left-and-right direction, respectively.

In the present embodiment, the longitudinal intermediate portion of the lower arm 22 means a left-and-right center portion of the lower arm 22. The left-and-right center portion of the lower arm 22 is pivotally connected to a lower portion of the support portion 33 of the base member 20 via a second pivot shaft 42. A junction between the lower arm 22 and the base member 20 is defined as a fourth junction 54. Referring to FIG. 3, a portion of the lower arm 22 extended leftward from the fourth junction 54 is defined as a second left arm 22L, and another portion of the lower arm 22 extended rightward from the fourth junction 54 is defined as a second right arm 22R. The second left arm 22L and the second right arm 22R are integrally joined to each other. The second pivot shaft 42 is extended slightly downwardly forward and parallel to the first pivot shaft 41.

Referring to FIG. 1, the second pivot shaft 42 is generally oriented in the fore-and-aft direction, however, slantwise so that its axial ends differ in height from each other. More specifically, the front end of the second pivot shaft 42 is slightly lower than the rear end of the second pivot shaft 42. The lower arm 22 is rotatable as a seesaw centered on the second pivot shaft 42.

The first support member 23 is disposed on one side of the base member 20 in the vehicle-width direction, more specifically, leftward from the base member 20. The first support member 23 is formed linearly to extend substantially perpendicular to the upper and lower arms 21 and 22, i.e., substantially vertically. When viewed along the turning center axis 39, the first support member 23 has a U-like shape whose open side is oriented rightward, i.e., proximally in the left-and-right direction so as to face the center portion of the vehicle leaning unit 5 in the vehicle-width direction. The left end portion of the upper arm 21 and the left end portion of the lower arm 22 are disposed inside of the sectionally U-shaped first support member 23.

A top end portion of the first support member 23 is pivotally connected to the left end portion of the upper arm 21 via a third pivot shaft 43. A junction between the first support member 23 and the upper arm 21 is defined as a second junction 52. The third pivot shaft 43 is oriented in the same direction as that of the first and second pivot shafts 41 and 42.

A bottom end portion of the first support member 23 is pivotally connected to the left end portion of the lower arm 22 via a fourth pivot shaft 44. A junction between the first support member 23 and the lower arm 22 is defined as a fifth junction 55. The fourth pivot shaft 44 is oriented in the same direction as that of the first and second pivot shafts 41 and 42 and parallel to the third pivot shaft 43.

The second support member 24 is disposed on the other side of the base member 20 in the vehicle-width direction, more specifically, rightward from the base member 20. The second support member 24 is formed linearly to extend substantially perpendicular to the upper and lower arms 21 and 22, i.e., substantially vertically. When viewed along the turning center axis 39, the second support member 24 has a U-like shape whose open side is oriented leftward, i.e., proximally in the left-and-right direction so as to face the center portion of the vehicle leaning unit 5 in the vehicle-width direction. The right end portion of the upper arm 21 and the right end portion of the lower arm 22 are disposed inside of the sectionally U-shaped second support member 24.

A top end portion of the second support member 24 is pivotally connected to the right end portion of the upper arm 21 via a fifth pivot shaft 45. A junction between the second support member 24 and the upper arm 21 is defined as a third junction 53. The fifth pivot shaft 45 is oriented in the same direction as that of the first and second pivot shafts 41 and 42.

A bottom end portion of the second support member 24 is pivotally connected to the right end portion of the lower arm 22 via a sixth pivot shaft 46. A junction between the second support member 24 and the lower arm 22 is defined as a sixth junction 56. The sixth pivot shaft 46 is oriented in the same direction as that of the first and second pivot shafts 41 and 42 and parallel to the fifth pivot shaft 45.

The first support member 23 and the second support member 24 are disposed leftward and rightward symmetrically with respect to the longitudinally intermediate portions of the upper and lower arms 21 and 22. The second support member 24 is spaced in the left-and-right direction from the first support member 23 so as to be substantially parallel to the first support member 23.

The left front wheel 6L is pivoted to the first support member 23. The left front wheel 6R is movable integrally with the first support member 23 in the rotational turning direction of the base member 20. In the present embodiment, the left front wheel 6L is supported by the first support member 23 via a first brake mechanism 61 and a left fixture member 62. The left fixture member 62 is fixed to a left portion of the first support member 23.

The first brake mechanism 61 includes a brake caliper 63 attached to the left fixture member 62. For example, the brake caliper 63 may be a caliper which is hydraulically pressed against a brake pad. The brake caliper 63 frictionally presses the brake pad (not shown) against a brake disk 64 on the left front wheel 6L to brake the left front wheel 6L.

The right front wheel 6R is pivoted to the second support member 24. The right front wheel 6R is movable integrally with the second support member 24 in the rotational turning direction of the base member 20. In the present embodiment, the right front wheel 6R is supported by the second support member 24 via a second brake mechanism 66 and a right fixture member 67. The right fixture member 66 is fixed to a right portion of the second support member 24.

The second brake mechanism 66 includes a brake caliper 68 attached to the right fixture member 67. For example, the brake caliper 68 may be a caliper which is hydraulically pressed against a brake pad. The brake caliper 68 frictionally presses the brake pad (not shown) against a brake disk 69 on the right front wheel 6R to brake the right front wheel 6R.

The upper arm 21, the lower arm 22, the first support member 23 and the second support member 24 constitute a parallel link mechanism 70. At least a part of the parallel link mechanism 70 (in the present embodiment, the whole parallel link mechanism 70) is disposed between the left front wheel 6L and the right front wheel 6R when the leaning vehicle 1 is viewed in front.

Figure 6:
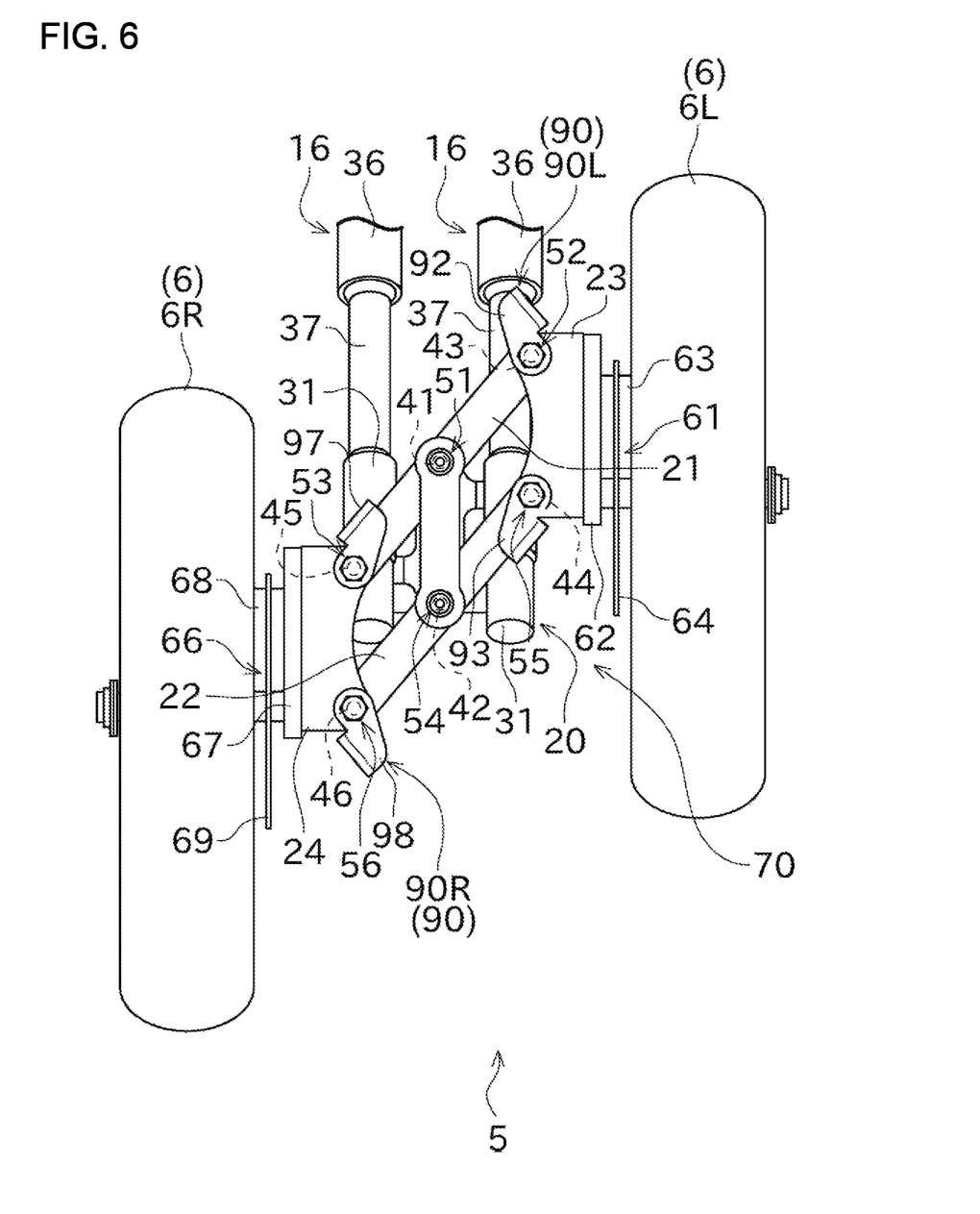
FIG. 6 is a view of an exemplary leaning state of the vehicle leaning unit.
Figure 7:
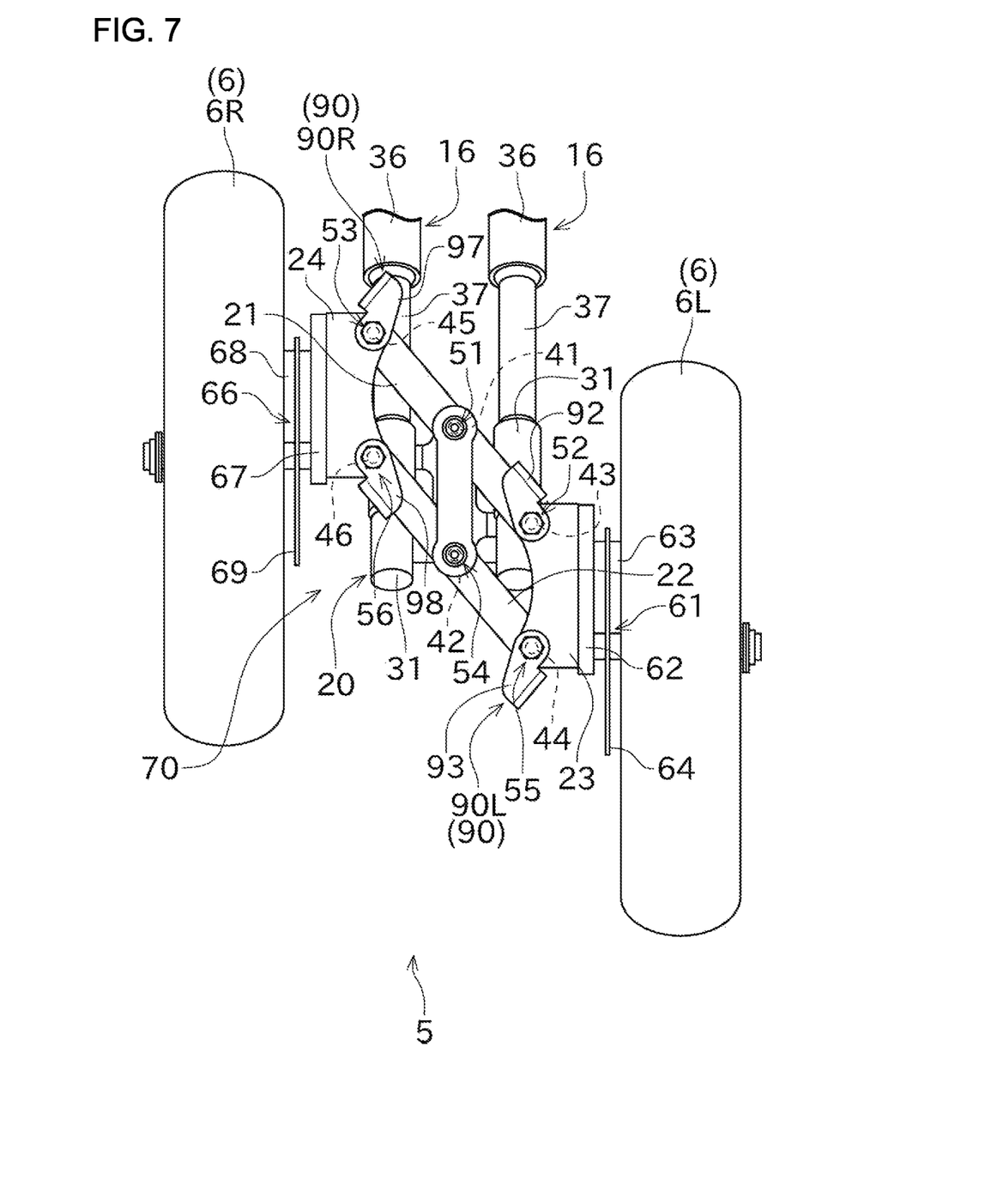
FIG. 7 is a view of another exemplary leaning state of the vehicle leaning unit.

In the parallel link mechanism 70, the upper and lower arms 21 and 22 and the first and second support members 23 and 24 are joined to each other at the second junction 52, the third junction 53, the fifth junction 55 and the sixth junction 56 via the and assembled together into a rectangular frame. The parallel link mechanism 70 is movable as shown in FIGS. 6 and 7, for example, by setting the first junction 51 and the fourth junction 54 as fulcrums.

In the present embodiment, a left-and-right length of the upper arm 21 between the second junction 52 and the third junction 53 is equal to a left-and-right length of the lower arm 22 between the fifth junction 55 and the sixth junction 56. A vertical length of the first support member 23 between the second junction 52 and the fifth junction 55 is equal to a vertical length of the second support member 24 between the third junction 53 and the sixth junction 56.

Due to the above-mentioned structure, during movement of the parallel link mechanism 70, the upper arm 21 rotates around the first pivotal shaft 41 relative to the base member 20, and the lower arm 22 rotates around the second pivot shaft 42 relative to the base member 20. Also, the upper arm 21 rotates around the third pivot shaft 43 relative to the first support member 23, and around the fifth pivot shaft 45 relative to the second support member 24. The lower arm 22 rotates around the fourth pivot shaft 44 relative to the first support member 23, and around the sixth pivot shaft 46 relative to the second support member 24. Accordingly, the left front wheel 6L and the right front wheel 6R move vertically relative to the base member 20 while their directions relative to the base member 20 are kept constant.

The parallel link mechanism 70 has the left-and-right length between the first and second junctions 51 and 52 and the left-and-right length between the first and third junctions 51 and 53, which are equal to each other, and has the left-and-right length between the fourth and fifth junctions 54 and 55 and the left-and-right length between the fourth and sixth junctions 54 and 56, which are equal to each other. Accordingly, during the movement of the parallel link mechanism 70, the vertical movements of the left and right front wheels 6L and 6R are kept symmetric so as to smoothly lean the leaning vehicle 1.

Regarding the configuration shown in FIG. 1, the first and second pivot shafts 41 and 42 are inclined downwardly forward with respect to the horizontal plane. Therefore, in side view, the first and second pivot shafts 41 and 42 are inclined downwardly forward with respect to the direction perpendicular to the turning center axis 39.

Figure 4:
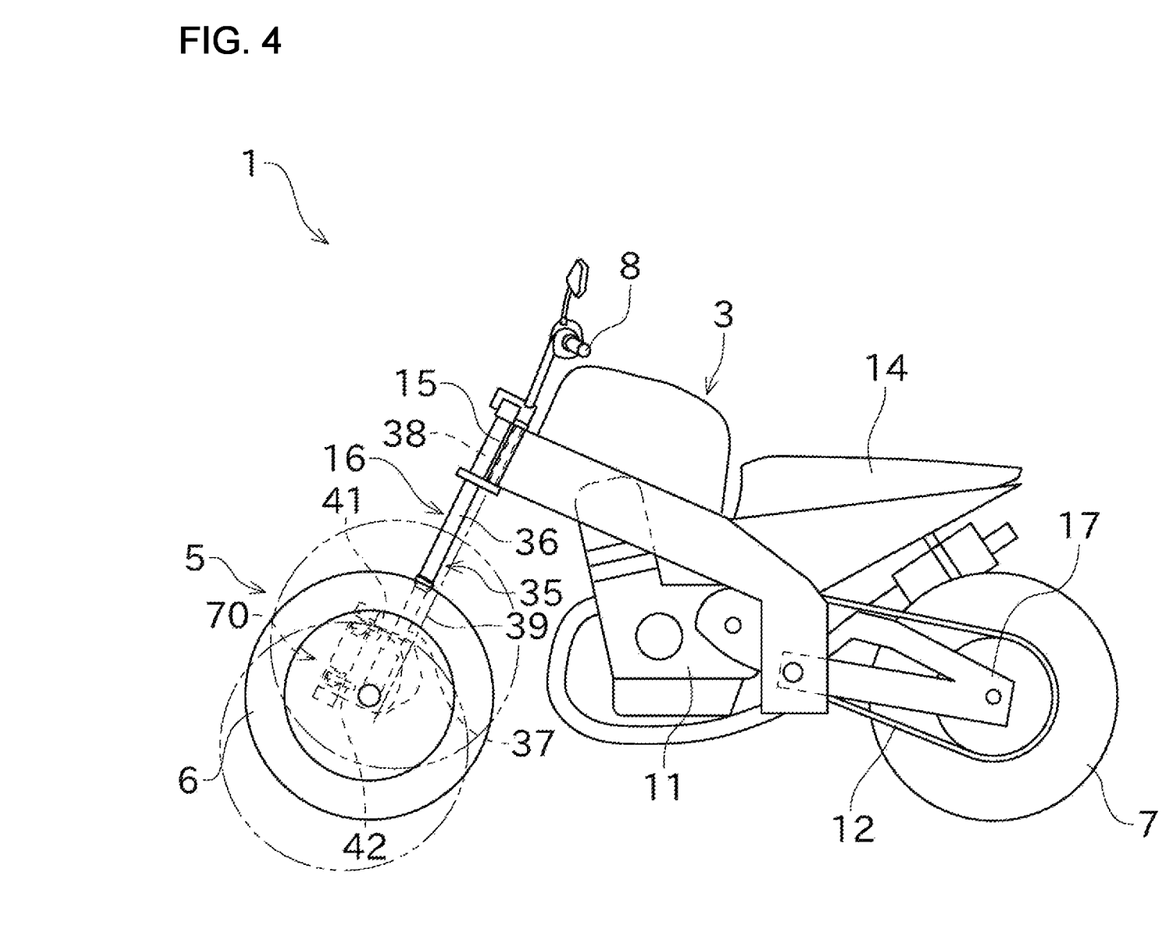
FIG. 4 is a side view of a leaning vehicle according to a first variation of the embodiment, in which first and second pivot shafts are oriented in a direction different from that in the embodiment of FIG. 1.

According to an alternative embodiment as shown in FIG. 4, the first and second pivot shafts 41 and 42 may be inclined upwardly forward with respect to the horizontal plane. In this embodiment, the first and second pivot shafts 41 and 42 are oriented perpendicular to the turning center axis 39. However, in side view, the first and second pivot shafts 41 and 42 may be oriented at a non-right angle from the turning center axis 39.

Figure 5:
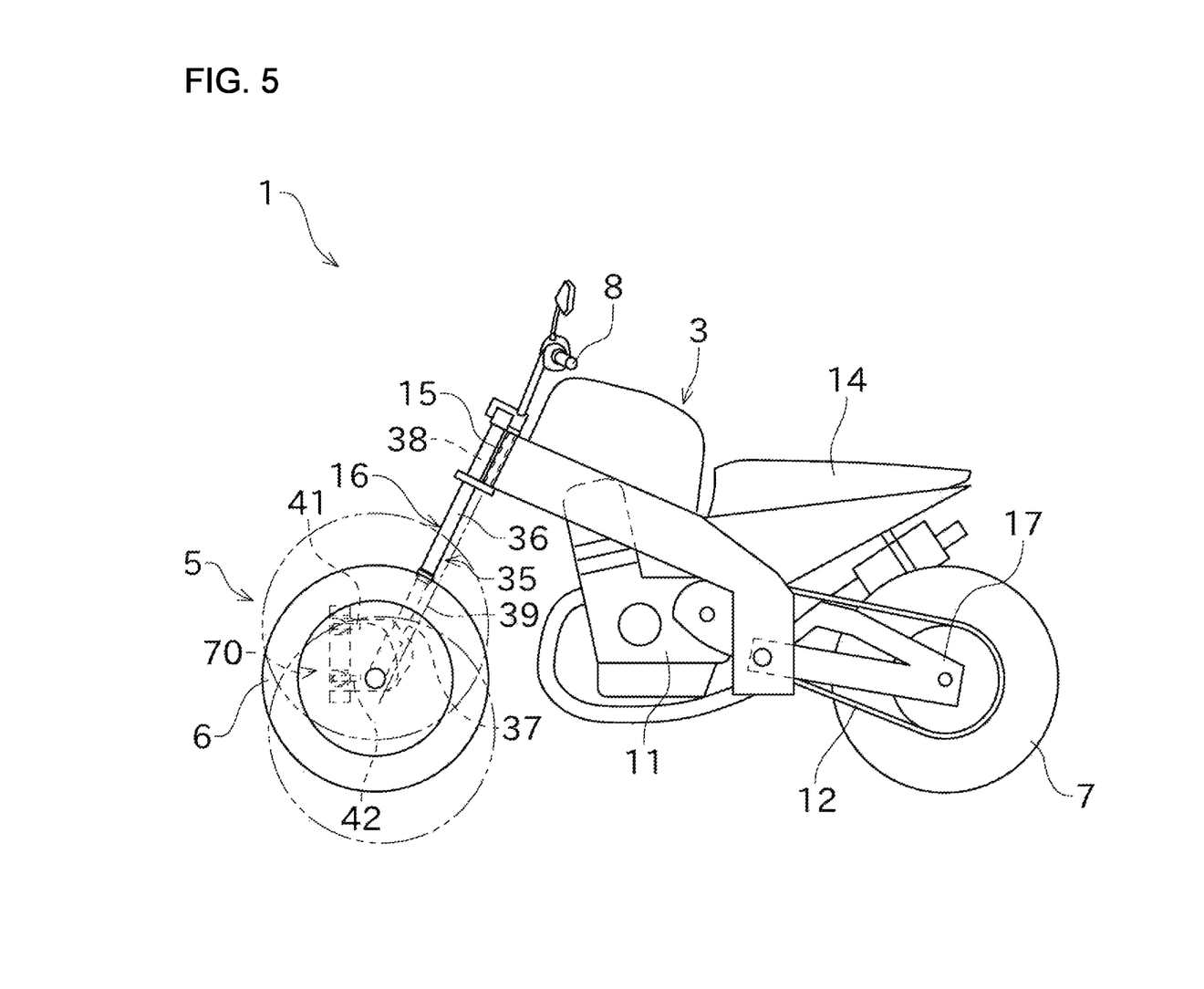
FIG. 5 is a side view of a leaning vehicle according to a second variation of the embodiment, in which first and second pivot shafts are oriented in another direction different from that in the embodiment of FIG. 1.

According to another alternative embodiment as shown in FIG. 5, the first and second pivot shafts 41 and 42 may be oriented substantially horizontally, i.e., substantially parallel to a road surface. In this case, the leaning vehicle 1 has high independency between its steering and its roll motion so as to reduce steering inputs caused by disturbance, thereby stabilizing the vehicle body 3.

From the viewpoint of increasing the generated restoring force to increase the traveling stability, of FIGS. 1, 4 and 5, FIG. 1 shows the best orientation of the first and second pivot shafts 41 and 42, and FIG. 4 shows the second-best.

In the present embodiment, the first, second and third junctions 51, 52 and 53 are aligned on a straight line when viewed along the third, fourth, fifth and sixth pivot shafts 43, 44, 45 and 46 serving as pivot axes for rotational motion of the parallel link mechanism 70. The fourth, fifth and sixth junctions 54, 55 and 56 are aligned on a straight line when viewed in the same direction as mentioned above.

Figure 8:
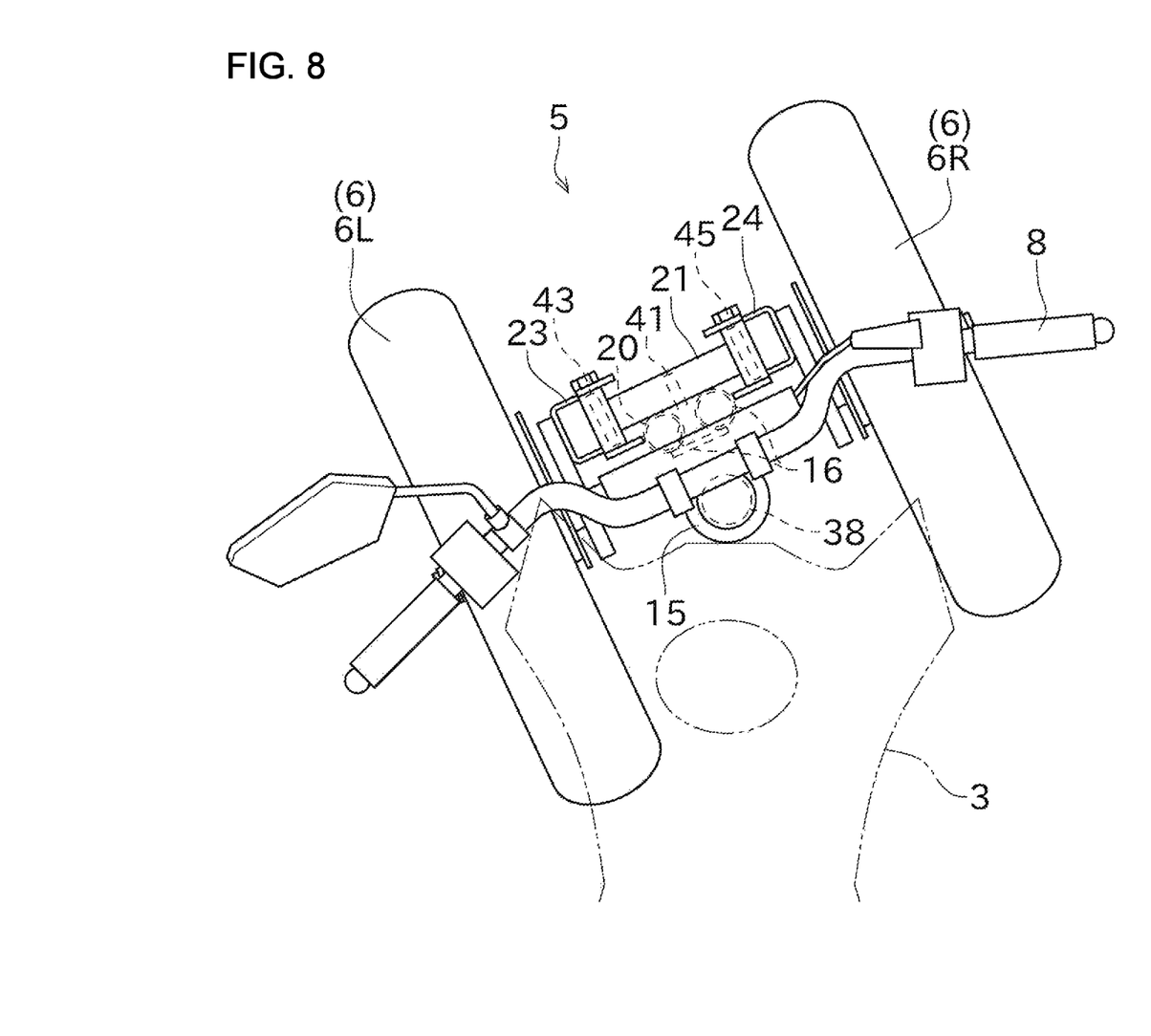
FIG. 8 is a plan view of the vehicle leaning unit when the leaning vehicle turns.

Due to the configuration, when the steering handle 8 is operated, the entire vehicle leaning unit 5, including the base member 20, the upper arm 21, the lower arm 22, the first support member 23, the second support member 24, the left front wheel 6L and the right front wheel 6R turns around the turning center axis 39. In other words, according to operation of the steering handle 8, all the component members of the vehicle leaning unit 5 move integrally in their turning direction. Therefore, as shown in FIG. 8, the leaning vehicle 1 is steered to change its traveling direction. Incidentally, the embodiment shown in FIG. 8 is based on the orientation of the first and second pivot shafts 41 and 42 substantially perpendicular to the turning center axis 39 as shown in FIG. 4.

Referring to FIGS. 6 and 7, the left front wheel 6L and the right front wheel 6R move in vertically opposite directions according to the movement of the parallel link mechanism 70. More specifically, due to the relative rotation of the upper and lower arms 21 and 22 and the first and second support members 23 and 24, when the left front wheel 6L moves upward, the right front wheel 6R moves downward as shown in FIG. 6, and when the left front wheel 6L moves downward, the right front wheel 6R moves upward as shown in FIG. 7. In this way, when one front wheel 6 moves upward to a degree, simultaneously, the other front wheel 6 moves downward to the same degree.

To make the vertically positional difference between the left and right front wheels 6 understood easily, each of FIGS. 1, 6 and 7 illustrates the vehicle leaning unit 5 with the vehicle body 3 set upright. However, actually, the vehicle body 3 leans at a degree corresponding to the vertically positional difference between the left and right front wheels 6 with respect to the road surface. In this way, the leaning vehicle 1 has such a simple configuration to enable traveling with the vehicle body 3 leaning.

Further, in the present embodiment, the vehicle leaning unit 5 is provided with a restriction system. The restriction system includes at least one restriction member 90 to restrict a rotation angle range of at least one of the upper and lower arms 21 and 22. In the present embodiment, the restriction system includes a pair of left and right restriction members 90 each of which restricts both the rotation angle ranges of the upper and lower arms 21 and 22 during the movement of the parallel link mechanism 70.

The left and right restriction members 90 are disposed symmetrically with respect to the respective left-and-right center portions of the upper and lower arms 21 and 22. Hereinafter, the left one of the restriction members 90 may be referred to as a left restriction member 90L, and the right one of the restriction members 90 may be referred to as a right restriction member 90R.

The left restriction member 90L restricts the rotation angle ranges of the upper and lower arms 21 and 22 relative to the first support member 23. The left restriction member 90L includes a main body 91, an upper protrusion 92 and a lower protrusion 93.

The main body 91 is fixed to the first support member 23. The main body 91 is disposed between upper and lower end portions of the first support member 23 and is extended along the first support member 23. The upper protrusion 92 is formed on an upper end of the main body 91, and the lower protrusion 93 is formed on a lower end of the main body 91.

The upper protrusion 92 protrudes slantwise from the upper end of the main body 91 to a space above a left side portion of the upper arm 21 so as to be spaced from the left side portion of the upper arm 21. The lower protrusion 93 protrudes slantwise from the lower end of the main body 91 to a space below a left side portion of the lower arm 22 so as to be spaced from the left side portion of the lower arm 22.

The right restriction member 90R restricts the rotation angle ranges of the upper and lower arms 21 and 22 relative to the second support member 24. The right restriction member 90R includes a main body 96, an upper protrusion 97 and a lower protrusion 98.

The main body 96 is fixed to the second support member 24. The main body 96 is disposed between upper and lower end portions of the second support member 24 and is extended along the second support member 24. The upper protrusion 97 is formed on an upper end of the main body 96, and the lower protrusion 98 is formed on a lower end of the main body 96.

The upper protrusion 97 protrudes slantwise from the upper end of the main body 96 to a space above a right side portion of the upper arm 21 so as to be spaced from the right side portion of the upper arm 21. The lower protrusion 98 protrudes slantwise from the lower end of the main body 96 to a space below a right side portion of the lower arm 22 so as to be spaced from the right side portion of the lower arm 22.

Due to the above-mentioned configuration, when the left front wheel 6L moves upward and the right front wheel 6R moves downward so that the upper arm 21 and the lower arm 22 are going to rotate beyond the respective predetermined angles relative to the first support member 23 and the second support member 24, the lower protrusion 93 of the left restriction member 90L comes to abut against the left side portion of the lower arm 22, and the upper protrusion 97 of the right restriction member 90R comes to abut against the right side portion of the upper arm 21, as shown in FIG. 6. Therefore, the upper and lower arms 21 and 22 cannot rotate beyond the respective predetermined angles, so that the respective allowed rotation angles of the upper and lower arms 21 and 22 are restricted. As a result, the upwardly moved left front wheel 6L and the downwardly moved right front wheel 6R are positionally restricted.

When the left front wheel 6L moves downward and the right front wheel 6R moves upward so that the upper arm 21 and the lower arm 22 are going to rotate beyond the respective predetermined angles relative to the first support member 23 and the second support member 24, the upper protrusion 92 of the left restriction member 90L comes to abut against the left side portion of the upper arm 21, and the lower protrusion 98 of the right restriction member 90R comes to abut against the right side portion of the lower arm 22, as shown in FIG. 7. Therefore, the upper and lower arms 21 and 22 cannot rotate beyond the respective predetermined angles, so that the respective allowed rotation angles of the upper and lower arms 21 and 22 are restricted. As a result, the downwardly moved left front wheel 6L and the upwardly moved right front wheel 6R are positionally restricted.

Therefore, the lean of the vehicle body 3 is prevented from becoming excessive, thereby ensuring stability of the vehicle body 3. The first or second support member 23 or 24 is prevented from excessively moving upward relative to the base member 20, thereby protecting the left or right front wheel 6L or 6R from interfering with another portion of the leaning vehicle 1. Incidentally, the allowed rotation angle ranges of the upper and lower arms 21 and 22 may be optionally determined so as to prevent the vehicle body 3 from excessively leaning.

Figure 9:
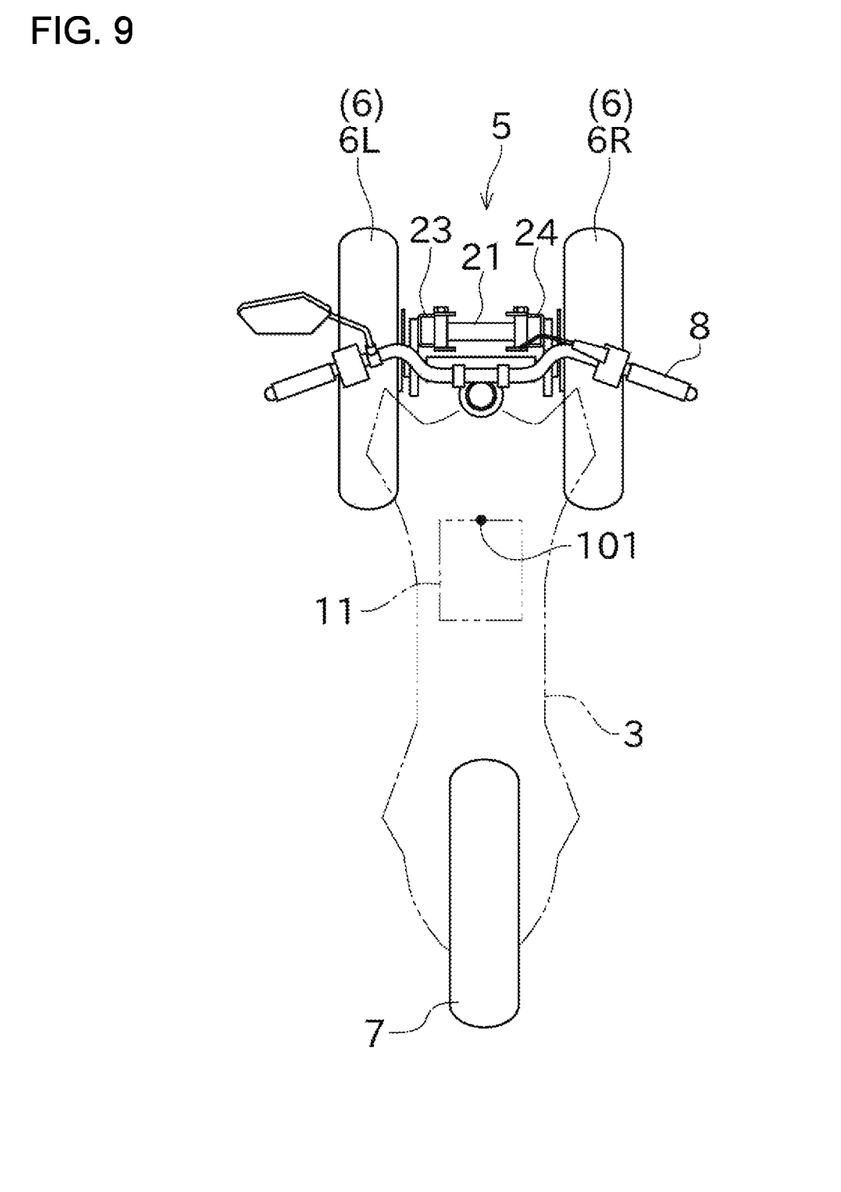
FIG. 9 is a schematic plan view of the leaning vehicle showing its center of gravity.

Further, referring to FIG. 9, in the present embodiment, the leaning vehicle 1 is configured to have a center of gravity 101 inside of a triangle in plan view connecting the left front wheel 6L, the right front wheel 6R and the rear wheel 7 as well as the leaning vehicle 1 is provided with the first and second brake mechanisms 61 and 66.

The center of gravity of the leaning vehicle 1 corresponds to a center of gravity of the unridden leaning vehicle 1 or a center of gravity of the leaning vehicle 1 ridden with an occupant thereon. For example, when viewed in plan, the center of gravity 101 of the leaning vehicle 1 is disposed adjacent to a front end of the engine 11. An appropriate distance (i.e., tread) between the left front wheel 6L and the right front wheel 6R is preset. For example, the tread is about 1 meter.

Due to the above-mentioned configuration, when the leaning vehicle 1 stops with the first and second brake mechanisms 61 and 66 applying braking forces, the leaning vehicle 1 can easily stand stably by self-support. Therefore, for example, when the leaning vehicle 1 is parked or temporarily stopped, the occupant does not need to take an additional labor for keeping the leaning vehicle 1 from falling.

As described above, the leaning vehicle 1 according to the present embodiment includes the vehicle body 3, the base member 20, the upper arm 21, the lower arm 22, the first support member 23, the second support member 24, the left front wheel 6L, the right front wheel 6R, and the steering handle 8. The base member 20 is supported by the vehicle body 3 so as to be turnable around the turning center axis 39 relative to the vehicle body 3. The upper arm is pivoted at the longitudinally intermediate portion thereof to the base member 20 at a height. The lower arm 22 is pivoted at the longitudinally intermediate portion thereof to the base member 20 at another height below the height to pivot the upper arm 21 to the base member 20. The first support member 23 is disposed leftward from the base member 20. The second support member 24 is disposed rightward from the base member 20. The left front wheel 6L is pivoted to the first support member 23.

The right front wheel 6R is pivoted to the second support member 24. The steering handle 8 is operable to turn the base member 20. The upper arm 21, the lower arm 22, the first support member 23 and the second support member 24 constitute the parallel link mechanism 70. The left front wheel 6L is movable integrally with the first support member 23 in the turning direction of the base member 20. The right front wheel 6R is movable integrally with the second support member 24 in the turning direction of the base member 20. According to turning of the base member 20, all of the upper arm 21, the lower arm 22, the first support member 23, the second support member 24, the left front wheel 6L and the right front wheel 6R turn around the turning center axis 39 of the base member 20.

Therefore, by turning the base member 20, all the parallel link mechanism 70 and the two front wheels 6 turn to change the traveling direction of the leaning vehicle 1. Such a simple structure achieves the required leaning and travel direction changing of the leaning vehicle 1, thereby reducing the number of component members and costs. Further, since the left front wheel 6L and the right front wheel 6R turn together with the parallel link mechanism 70 according to operation of the steering handle 8, a play in turning of the left and right front wheels 6L and 6R in response to operation of the steering handle 8 is reduced, thereby enhancing the feeling of direct steering response.

In the leaning vehicle 1, the parallel link mechanism 70 includes the first to third junctions 51, 52 and 53 which are aligned on the straight line in view along the third to sixth pivot shafts 43, 44, 45 and 46 oriented in an identical direction defined as a pivot axial direction of the parallel link mechanism 70. The first junction 51 is defined as a junction between the upper arm 21 and the base member 20, where the left-and-right center portion of the upper arm 21 serving as the longitudinally intermediate portion of the upper arm 21 is pivoted to the base member 20 via the first pivot shaft 41. The second junction 52 is defined as a junction between the upper arm 21 and the first support member 23, where the left end portion of the upper arm 21 serving as one of the longitudinally opposite side portions of the upper arm 21 is pivoted to the first support member 23 via the third pivot shaft 43. The third junction 53 is defined as a junction between the upper arm 21 and the second support member 24, where the right end portion of the upper arm 21 serving as the other of the longitudinally opposite side portions of the upper arm 21 is pivoted to the second support member 24 via the fourth pivot shaft 44. The parallel link mechanism 70 further includes the fourth to sixth junctions 54, 55 and 56 which are aligned on the straight line in view along the third to sixth pivot shafts 43, 44, 45 and 46. The fourth junction 54 is defined as a junction between the lower arm 22 and the base member 20, where the left-and-right center portion of the lower arm 22 serving as the longitudinally intermediate portion of the lower arm 22 is pivoted to the base member 20 via the second pivot shaft 42. The fifth junction 55 is defined as a junction between the lower arm 22 and the first support member 23, where the left end portion of the lower arm 22 serving as one of the longitudinally opposite side portions of the lower arm 22 is pivoted to the first support member 23 via the fifth pivot shaft 45. The sixth junction 56 is defined as a junction between the lower arm 22 and the second support member 24, where the right end portion of the lower arm 22 serving as the other of the longitudinally opposite side portions of the lower arm 22 is pivoted to the second support member 24 via the sixth pivot shaft 46.

Therefore, smooth leaning can be realized.

The leaning vehicle 1 includes the restriction member 90 for restricting the rotation angle range of at least one of the upper arm 21 and the lower arm 22.

Therefore, the leaning of the vehicle body 3 is restricted from being excessive, thereby ensuring the stability of the vehicle body 3. The first support member 23 or the second support member 24 is prevented from excessively rising relative to the base member 20, thereby preventing the left and right front wheels 6L and 6R from interfering with another portion of the leaning vehicle 1.

When the leaning vehicle 1 is viewed in front, at least a part of the parallel link mechanism 70 is disposed between the left front wheel 6L and the right front wheel 6R.

Therefore, the entire leaning vehicle 1 becomes compact.

In the leaning vehicle 1, each of the first pivot shaft 41, serving as the pivot axis pivoting the upper arm 21 to the base member 20, and the second pivot shaft 42, serving as the pivot axis pivoting the lower arm 22 to the base member 20, is inclined to have opposite axial ends different in height from each other.

Therefore, the restoring force for leading the leaning vehicle 1 into straight traveling can be effectively applied to the front wheels 6.

Regarding to the leaning vehicle 1 configured as shown in FIG. 1, each of the first and second pivot shafts 41 and 42 is inclined forwardly downward from the horizontal plane.

Therefore, the restoring force can be further effectively applied to the front wheels 6.

Alternatively, in the leaning vehicle 1, both the first pivot shaft 41, serving as the pivot axis pivoting the upper arm 21 to the base member 20, and the second pivot shaft 42, serving as the pivot axis pivoting the lower arm 22 to the base member 20, are parallel to the road surface.

Therefore, the steering action of the leaning vehicle 1 becomes more independent of the rolling action of the leaning vehicle 1, thereby reducing the steering inputs caused by disturbance so as to stabilize the vehicle body 3.

The leaning vehicle 1 includes the front forks 16 interposed between the steering handle 8 and the base member 20. The steering handle 8, the front forks 16 and the base member 20 are integrally turnable relative to the vehicle body 3.

Therefore, such a simple configuration including the front forks 16 achieves the traveling direction change of the leaning vehicle 1.

In the leaning vehicle 1, the front forks 16 include the front suspensions 35 for reducing shock transmitted from the road surface to the vehicle body 3 via the left front wheel 6L or the right front wheel 6R.

Therefore, the shock transmitted from the road surface to the vehicle body 3 during traveling of the leaning vehicle 1 is reduced. This layout is simpler than that if the first and second support members 23 and 24 are provided with respective shock absorbers.

In the leaning vehicle 1, the upper arm 21 includes the first left arm 21L and the first right arm 21R. The first left arm 21L is disposed close to the first support member 23 leftward with respect to the left-and-right center portion of the upper arm 21. The first right arm 21R is disposed close to the second support member 24 rightward with respect to the left-and-right center portion of the upper arm 21. The lower arm 22 includes the second left arm 22L and the second right arm 22R. The second left arm 22L is disposed close to the first support member 23 leftward with respect to the left-and-right center portion of the lower arm 22. The second right arm 22R is disposed close to the second support member 24 rightward with respect to the left-and-right center portion of the lower arm 22.

Therefore, the upper and lower arms 21 and 22 can be supported by the base member 20 at both one side portions thereof close to the left front wheel 6L and the other side portions thereof close to the right front wheel 6R, thereby further effectively reducing the shock transmitted from the road surface to the vehicle body 3 via the left front wheel 6L or the right front wheel 6R.

In the leaning vehicle 1, both the upper arm 21 and the lower arm 22 are disposed forward from the base member 20 between the left front wheel 6L and the right front wheel 6R.

Therefore, in the leaning vehicle 1, the parallel link mechanism 70 is disposed so as to avoid its interference with the vehicle body 3, thereby increasing the freedom degree in designing a layout of the leaning vehicle 1.

The leaning vehicle 1 includes the single rear wheel 7 disposed at the center portion thereof in the left-and-right direction, i.e., the vehicle-width direction.

Therefore, such a simply configured three-wheeled vehicle can serve as the leaning vehicle 1.

The leaning vehicle 1 includes the first brake mechanism 61 and the second brake mechanism 62. The first brake mechanism 61 is provided for braking the left front wheel 6L. The second brake mechanism 62 is provided for braking the right front wheel 6R.

Therefore, when the leaning vehicle 1 stops, by holding the steering handle 8 at its neutral position and braking the left and right front wheels 6L and 6R, the vehicle body 3 can be secured in its attitude from unexpectedly leaning. As a result, the leaning vehicle 1 can stand by self-support without any special configuration such as a lean-locking mechanism.

The vehicle leaning unit 5 according to the present embodiment includes the base member 20, the upper arm 21, the lower arm 22, the first support member 23, the second support member 24, the left front wheel 6L and the right front wheel 6R. The base member 20 is adaptable turnably around the turning center axis 39.

The upper arm 21 is pivoted at the left-and-right center portion thereof to the upper portion of the base member 20. The lower arm 22 is pivoted at the left-and-right center portion thereof to the lower portion of the base member below the portion of the base member 20 pivoting the upper arm 21. The first support member 23 is disposed leftward from the base member 20. The second support member 24 is disposed on rightward from the base member 20. The left front wheel 6L is pivoted to the first support member 23. The right front wheel 6R is pivoted to the second support member 24. The upper arm 21, the lower arm 22, the first support member 23, the second support member 24 constitute the parallel link mechanism 70. The left front wheel 6L is movable integrally with the first support member 23 in the turning direction of the base member 20. The right front wheel 6R is movable integrally with the second support member 24 in the turning direction of the base member 20. According to turning of the base member 20, all of the upper arm 21, the lower arm 22, the first support member 23, the second support member 24, the left front wheel 6L and the right front wheel 6R turn around the turning center of the base member 20.

Therefore, by turning the base member 20, the parallel link mechanism 70 and the two front wheels 8 turn to change the traveling direction of a vehicle equipped with the vehicle leaning unit 5. By adapting the vehicle leaning unit 5 having such a simple structure to a vehicle, the required leaning and travel direction changing of the vehicle is achieved, thereby reducing the number of component members and costs.

The preferred embodiment and modified embodiments are as described above. For example, the embodiments may be further modified as follows:

What is the configuration of the vehicle leaning unit 5 to pivot the left front wheel 6L to the first support member 23 is not limitative only if the left front wheel 6L is turnable integrally with the first support member 23 in the turning direction of the base member 20.

What is the configuration of the vehicle leaning unit 5 to pivot the right front wheel 6R to the second support member 24 is not limitative only if the right front wheel 6R is turnable integrally with the second support member 24 in the turning direction of the base member 20.

In the above-mentioned embodiments, the restriction member 90 is configured so as to restrict both the rotation angle of the upper arm 21 and the rotation angle of the lower arm 22. However, this is not limitative. For example, the restriction member 90 may be configured so as to restrict only the rotation angle of the upper arm 21, or only the rotation angle of the lower arm 22.

The left and right juxtaposing of the pair of front forks 16 is not limitative. For example, the front forks 16 may be juxtaposed front and rear.

Obviously, numerous modifications and variations of the present invention are possible in light of the above teachings. It is therefore to be understood that within the scope of the appended claims, the invention may be practiced otherwise than as specifically described herein.

What is claimed is:

1. A leaning vehicle, comprising:
   a vehicle body;
   a base member supported by the vehicle body so as to be turnable around a turning center relative to the vehicle body;
   an upper arm whose longitudinally intermediate portion is pivoted to the base member at a height;
   a lower arm whose longitudinally intermediate portion is pivoted to the base member at another height below the height to pivot the upper aim to the base member;
   a first support member disposed on one of opposite sides of the base member in a vehicle-width direction;
   a second support member disposed on the other of the opposite sides of the base member in the vehicle-width direction;
   a first wheel pivoted to the first support member;
   a second wheel pivoted to the second support member;
   a steering operation member operable to turn the base member; and
   a restriction member restricting a rotation angle range of at least one of the upper arm and the lower arm by abutting the at least one of the upper arm and the lower arm,
   wherein the upper arm, the lower arm, the first support member and the second support member constitute a parallel link mechanism,
   wherein the first wheel is movable integrally with the first support member in a turning direction of the base member,
   wherein the second wheel is movable integrally with the second support member in the turning direction of the base member, and
   wherein according to turning of the base member, all of the upper arm, the lower arm, the first support member, the second support member, the first wheel and the second wheel turn around the turning center of the base member.

2. The leaning vehicle according to claim 1, wherein the parallel link mechanism includes:
   a first junction where the longitudinally intermediate portion of the upper arm is pivotally connected to the base member;
   a second junction where one of the longitudinally opposite side portions of the upper arm is pivotally connected to the first support member;
   a third junction where the other of the longitudinally opposite side portions of the upper arm is pivotally connected to the second support member,
   a fourth junction where the longitudinally intermediate portion of the lower arm is pivotally connected to the base member;
   a fifth junction where one of the longitudinally opposite side portions of the lower arni is pivotally connected to the first support member;
   a sixth junction where the other of the longitudinally opposite side portions of the lower arm is pivotally connected to the second support member; and
   wherein the first junction, the second junction and the third junction are aligned on a straight line in view along pivot axes of the parallel link mechanism, and
   wherein the fourth junction, the fifth junction and the sixth junction are aligned on a straight line in view along the pivot axes of the parallel link mechanism.

3. The leaning vehicle according to claim 1, wherein when the leaning vehicle is viewed in front, at least a part of the parallel link mechanism is disposed between the first wheel and the second wheel.

4. The leaning vehicle according to claim 1, wherein a pivot axis pivoting the upper arm to the base member and a pivot axis pivoting the lower arm to the base member are each inclined to have opposite axial ends different in height from each other.

5. The leaning vehicle according to claim 4, wherein the pivot axis pivoting the upper arm to the base member and the pivot axis pivoting the lower arm to the base member are each inclined forwardly downward from a horizontal plane.

6. The leaning vehicle according to claim 1, wherein both a pivot axis pivoting the upper arm to the base member and a pivot axis pivoting the lower arm to the base member are parallel to a road surface.

7. The leaning vehicle according to claim 3, further comprising:
   a transmission member interposed between the steering operation member and the base member,
   wherein the steering operation member, the transmission member, and the base member are integrally turnable relative to the vehicle body.

8. The leaning vehicle according to claim 7, wherein the transmission member includes a shock absorber for reducing a shock transmitted from a road surface to the vehicle body via the first wheel or the second wheel.

9. The leaning vehicle according to claim 8, wherein the upper arm includes:
   a first left arm portion disposed close to the first support member leftward with respect to the longitudinally intermediate portion of the upper arm; and
   a first right arm portion disposed close to the second support member rightward with respect to the longitudinally inteimediate portion of the upper arm, and
   wherein the lower arm includes:
   a second left arm portion disposed close to the first support member leftward with respect to the longitudinally intermediate portion of the lower arm; and
   a second right arm portion disposed close to the second support member rightward with respect to the longitudinally intermediate portion of the lower aim.

10. The leaning vehicle according to claim 4, wherein both the first wheel and the second wheel are front wheels, and wherein both the upper arm and the lower arm are disposed forward from the base member.

11. The leaning vehicle according to claim 4, further comprising:
    a single rear wheel disposed at a center portion of the leaning vehicle in the vehicle-width direction,
    wherein both the first wheel and the second wheel are front wheels.

12. The leaning vehicle according to claim 1, further comprising:
    a first brake mechanism braking the first wheel; and
    a second brake mechanism braking the second wheel.

13. The leaning vehicle according to claim 1, wherein the restriction member is fixed to the first support member and restricts a rotation of the upper arm and the lower arm beyond a predetermined angle by abutting the at least one of the upper arm and the lower arm.

14. The leaning vehicle according to claim 13, further comprising a further restriction member, the further restriction member being fixed to the second support member and restricting the rotation of the upper arm and the lower arm beyond the predetermined angle by abutting the at least one of the upper arm and the lower arm.

15. A vehicle leaning unit, comprising:
- a base member adaptable turnably around a turning center;
- an upper arm whose longitudinally intermediate portion is pivoted to the base member at a height;
- a lower arm whose longitudinally intermediate portion is pivoted to the base member at another height below the height to pivot the upper arm to the base member;
- a first support member disposed on one of opposite sides of the base member in a vehicle-width direction;
- a second support member disposed on the other of the opposite sides of the base member in the vehicle-width direction;
- a first wheel pivoted to the first support member;
- a second wheel pivoted to the second support member; and
- a restriction member restricting a rotation angle range of at least one of the upper arm and the lower arm by abutting the at least one of the upper arm and the lower arm,
- wherein the upper arm, the lower arm, the first support member and the second support member constitute a parallel link mechanism,
- wherein the first wheel is movable integrally with the first support member in a turning direction of the base member,
- wherein the second wheel is movable integrally with the second support member in the turning direction of the base member, and
- wherein according to turning of the base member, all of the upper arm, the lower ann, the first support member, the second support member, the first wheel and the second wheel turn around the turning center of the base member.

* * * * *